United States Patent [19]

Tzifkansky et al.

[11] Patent Number: 4,576,309
[45] Date of Patent: Mar. 18, 1986

[54] FOOD CONTAINER

[75] Inventors: Guy Tzifkansky, Fontenay aux Roses; Jean-Claude Marchais, L'Hay les Roses, both of France

[73] Assignee: Cidelcem, Paris, France

[21] Appl. No.: 755,990

[22] Filed: Jul. 17, 1985

[30] Foreign Application Priority Data

Jul. 20, 1984 [FR] France .................................. 84 11575

[51] Int. Cl.[4] .............................................. B65D 51/16
[52] U.S. Cl. ....................................... 220/366; 220/360
[58] Field of Search ......... 220/366, 360, 231, DIG. 27

[56] References Cited

U.S. PATENT DOCUMENTS

| 1,926,240 | 9/1933 | Maas | 220/366 X |
| 1,953,765 | 4/1934 | McCluney | 220/366 |
| 2,241,064 | 5/1941 | Harbison | 220/360 |
| 2,936,094 | 5/1960 | Smith | 220/366 X |
| 3,741,815 | 6/1973 | Peterson | 220/366 X |

FOREIGN PATENT DOCUMENTS 310470 7/1930 United Kingdom ................ 220/231

Primary Examiner—Steven M. Pollard
Attorney, Agent, or Firm—Sughrue, Mion, Zinn, Macpeak & Seas

[57] ABSTRACT

A food container comprises a bottom (3) which is substantially rectangular and which has outwardly flared walls (4) rising therefrom and terminating in a substantially rectangular opening (7). The tops of the walls are outwardly surrounded by a horizontal rim (5) which is rectangular in shape and they are capped by a vertical rib (6) extending above the rim (5). The container has a cover (2) having a horizontal rim (8) and a vertical rib (9) extending downwardly therefrom suitable for engaging around the vertical rib (6) of the container (1). The vertical ribs (6, 9) being of substantially the same height on the container (1) and the cover (2). The cover rib (9) has a plurality of shoulders (16) near the top thereof for co-operating with the container rib (6), and enabling an upper position and a lower position to be defined for the cover (2) on the container (1).

7 Claims, 22 Drawing Figures

FOOD CONTAINER

FIELD OF THE INVENTION

The present invention relates to a vertically upwardly open food container having a substantially rectangular horizontal bottom and flared upright walls terminating in a substantially rectangular horizontal opening and including a horizontal rim near the top thereof which is outwardly rectangular in cross-section and which surrounds the opening to the container, and a vertical rib extending the walls above the rim, said container being provided with a cover horizontal including firstly a horizontal rim and secondly a vertical rib projecting from beneath the rim and engaging around the vertical rib of the container, with the vertical rib of the container having substantially the same height as the vertical rib of the cover.

BACKGROUND OF THE INVENTION

One such container is described in French patent specification No. 80-21565.

Such a container is effectively proof against external splashes of liquid which may occur after it has been filled.

Further, the cover is easily lifted off the container even though it does not include a handle which could cause difficulty when cleaning.

It has been observed that to ensure good conservation of food in the container, it is necessary either to have very slight ventilation or else considerably greater ventilation depending on the nature of the food.

Thus, fresh or cooked vegetables require slight ventilation whereas raw meat requires greater ventilation.

SUMMARY OF THE INVENTION

A food container according to the invention uses a single cover to provide both types of ventilation and includes the improvement whereby the rib on the cover includes a plurality of shoulders adjacent its upper portion for co-operating with the rib on the container so that in a first position the cover is raised so that the bottom of the cover rib does not engage the rim of the container, and in a second position the cover is lowered so that the bottom of the cover rib comes into contact with or is adjacent to the rim of the container, whereby the gap existing between the cover and the container when the cover is in the raised position enables considerable ventilation to take place.

Thus, when the cover is in its first or raised position a considerable flow of air occurs between the two ribs. However, when the cover is in its second or lowered position the air flow is restricted to leakage between the rib on the cover and the rim on the container and also between the rib on the container and the cover.

In one embodiment of the invention, the rib on the container is fitted with notches in which the said shoulders are received when the cover is in its second position, whereas the said shoulders rest on the top of the container rib when the cover is in its first or raised position.

According to an improvement of the invention, the outside portion of the container rib is provided with upper and lower projections, and the cover rib is provided with inwardly directed teeth near the bottom edge thereof, said teeth engaging beneath the upper projections when the cover is in its first or raised position, and beneath the lower projections when the cover is in its second or lower position.

The cover can thus be fixed to the container.

In a variant, the container rib is provided with outwardly directed upper and lower projections near the top thereof, and said shoulders rest on said upper projections when the cover is in its first or upper position and on said lower projections when the cover is in its second or lower position.

In this variant, the rib of the container no longer includes notches which are ugly and may be a handicap during container cleaning.

In a particularly advantageous improvement of this variant, the cover rib is provided with unwardly directed teeth at the bottom thereof, said teeth engaging under the upper projections when the cover is in its first or upper position and under the lower projections when the cover is in its second or lower position.

The same projections are thus used both to support the shoulders and to fix the cover down onto the container.

According to an improvement of the invention, the bottom face of the cover is provided with a second vertical rib parallel to the said vertical rib, the said second vertical rib serving to hold condensation water, thereby preventing possible sealing due to the condensation water occupying the space between the cover and the rib of the container when the cover is in the low ventilation position, and also preventing too fast dehydration of the stored food when the cover is in the high ventilation position.

According to another improvement of the invention, the top face of the cover includes a raised portion going all the way round the cover and interrupted at one point, said raised portion being disposed around a rectangle which is larger than the bottom of the container, and which lies between the sizes of the first and second ribs situated on the bottom face of the cover, thereby enabling covers to be stacked on one another and also enabling containers to be stacked on covers.

It is thus possible to store covers on their own in a stack of covers and it is also possible to store closed containers in a stack of closed containers with each higher container being received on each lower cover.

BRIEF DESCRIPTION OF THE DRAWINGS

An embodiment of the invention is described by way of example with reference to the accompanying drawings in which.

MORE DETAILED DESCRIPTION

Figure 1:
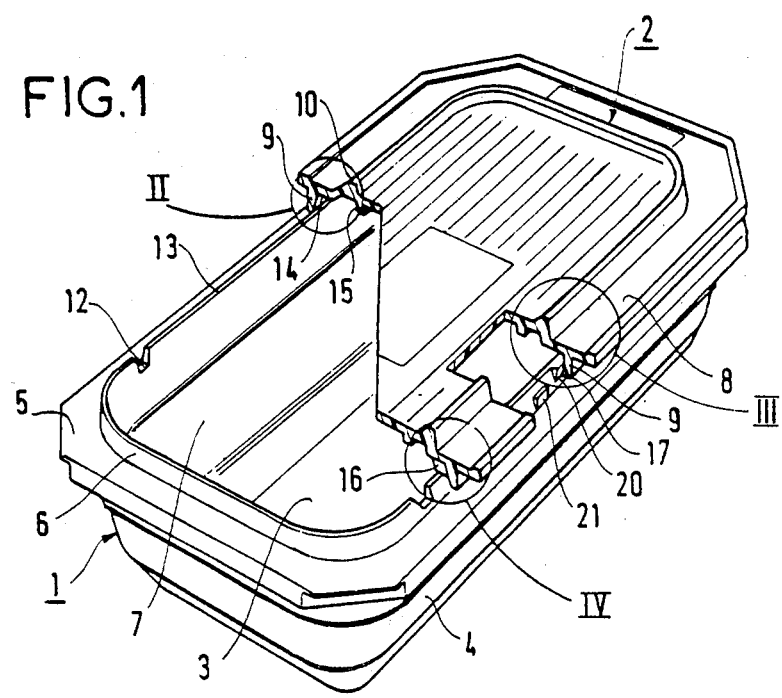
FIG. 1 is a partially cut-away perspective view of a food container in accordance with the invention having its cover in the high ventilation position.

The vertically upwardly open container 1 (see FIG. 1) is provided with a horizontal cover 2.

The container 1 comprises a flat horizontal bottom 3 which is generally rectangular in shape having rounded corners together with walls 4 rising therefrom in a flared configuration.

The top portions of the walls 4 are surrounded by a horizontal rim 5. The walls 4 are themselves extended upwardly by a vertical rib 6 which delimits a generally rectangular opening 7 having rounded corners.

The cover 2 comprises a rim 8 which extends above the rim 5 when the cover 2 is placed on the container 1.

The bottom face 14 of the cover 2 is substantially plane and is provided with a vertical rib 9 of substantially the same height as the vertical rib 6, and which is disposed around the rib 6 when the cover is placed on the container.

The bottom face 14 further includes a second downwardly directed rib 15 which is parallel to the rib 9 and which is disposed inwardly therefrom, in order to stop the condensation water which collects on the bottom surface of the cover from flowing into the gap between the cover and the rib 6 of the container. The second vertical rib 15 on the cover is smaller than its first vertical rib 9.

The cover 2 has an upwardly extending portion 10 on its top face, which portion extends around the cover following a rectangle with rounded corners which is larger than the bottom 3 of the container 1 and which is larger than the rectangle followed by the second rib 15 of the cover, but which is smaller than the rectangle followed by the first rib 9 on the bottom face of the cover 2.

The raised portion 10 includes a corner gap (not shown) in order to facilitate drip-drying the cover 2.

It is thus possible to place the bottom of a container on the top of a cover 2 since the bottom is located inside the raised portion. It is also possible to stack covers on one another since the raised portion 10 of a lower cover is received between the first and second ribs 9 and 15 on an upper cover.

The vertical rim 6 on the container 1 is provided with four notches 12 disposed close to the ends of the long sides 13 of the opening 7.

The outside of the rib 6 on each long side has a high projection 20 disposed adjacent to the top of said rib 6 and a low projection 21 disposed adjacent to the bottom thereof.

The projections 20 and 21 are disposed on either side of a mid plane perpendicular to the long sides of the opening and at the same distance from said plane.

The vertical rib 9 is provided with four shoulders 16 close to the top thereof. Said rib 9 includes two teeth 17 facing outwardly and symmetrically disposed about the longitudinal plane of symmetry.

Figure 3:
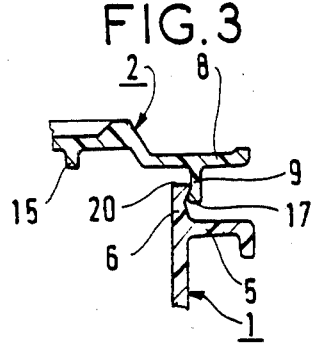
Figure 4:
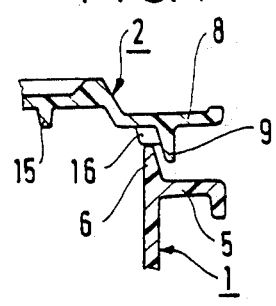
Figure 5:
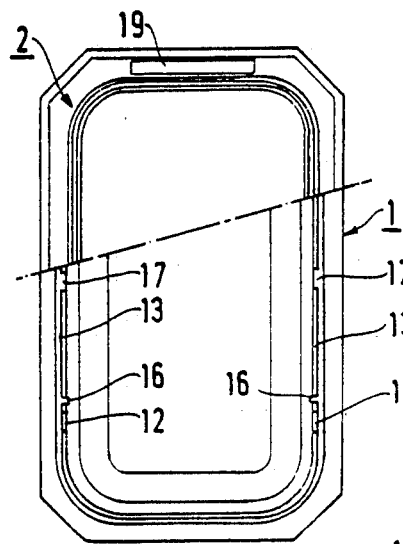
FIG. 5 is a plan view of a food container having its cover in a high ventilation position.

In a first position shown in FIGS. 1 and 5, the shoulders 16 are placed on the top edge of the rim 6 (see FIG. 4). At the same time, the teeth 17 are snap-fitted under the high projections 20 (see FIG. 3).

The outer wall of the rib 6 is preferably slightly inwardly inclined while the surrounding inner wall of the rib 9 is parallel thereto.

Figure 2:
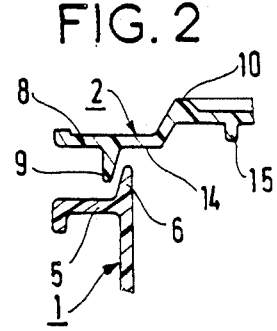
FIGS. 2, 3 and 4 are cross-sections on an enlarged scale showing details of FIG. 1.

Thus, when the cover 2 is in its first (or high) position there is a relatively large air passage between the tips of the ribs 6 and 9 (see FIG. 2).

Figure 7:
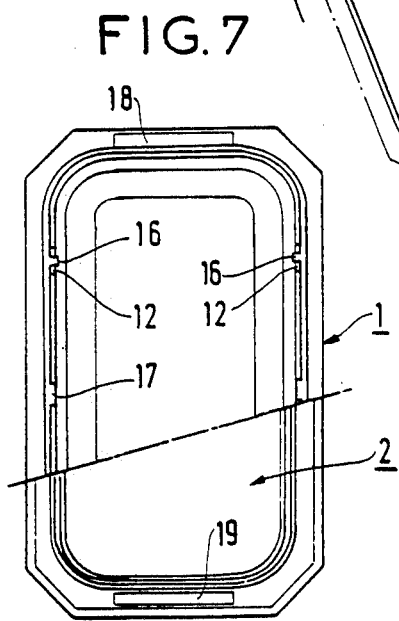
FIG. 7 is a plan view of the container showing its cover in the low ventilation position.
Figure 8:
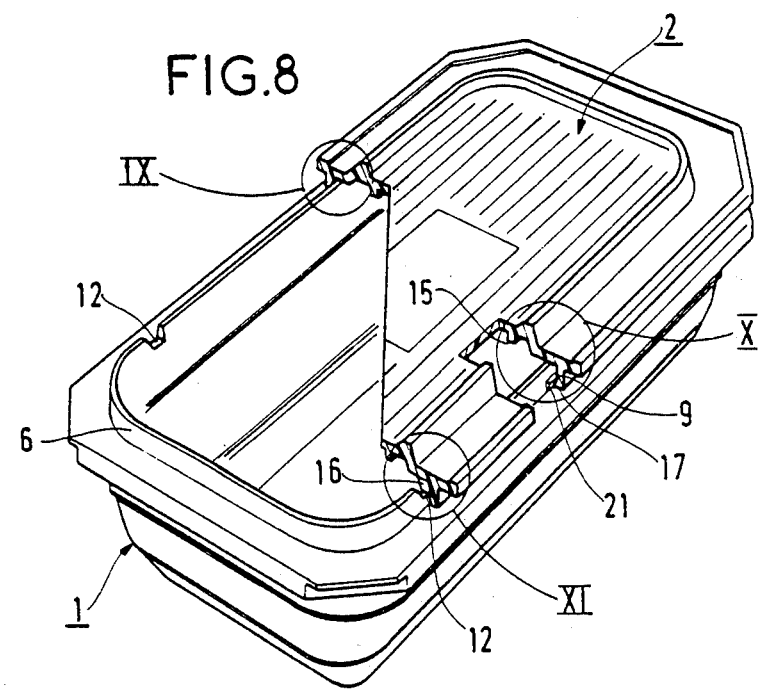
FIG. 8 is a partially cut-away perspective view of a food container and cover in the low ventilation position.
Figure 9:
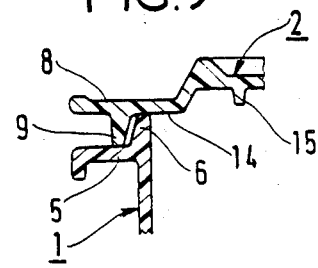
FIGS. 9 to 11 are section views on an enlarged scale of details of FIG. 8.

However, when the cover 2 is turned through 180° it occupies a second position (see FIGS. 7 and 8).

Figure 10:
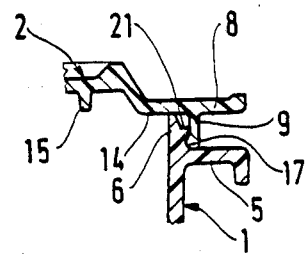
Figure 11:
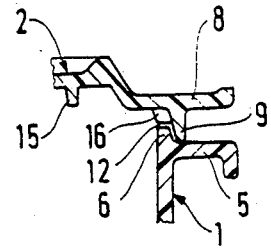
Figure 12:
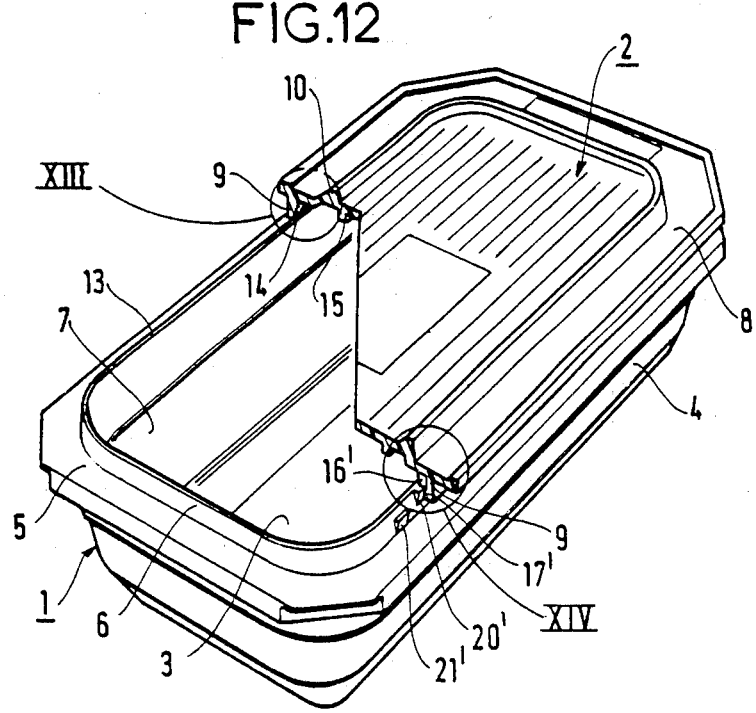
FIG. 12 is a partially cut-away perspective view of a variant food container in accordance with the invention in its high ventilation position.

In this second, or lower, position the shoulders 16 are received in the notches 12 (see FIG. 10). The rib 9 is in contact with the rim 5 and/or the tip of the rib 6 is in contact with the bottom face 14 of the cover 2 so that only small air leakage may take place therebetween.

In this position, the teeth 17 are snap-fitted under the lower projections 21. The ribs 6 and 9 are resilient to some extent thereby enabling the cover to be put into place on the container and to be removed therefrom.

Figure 6:
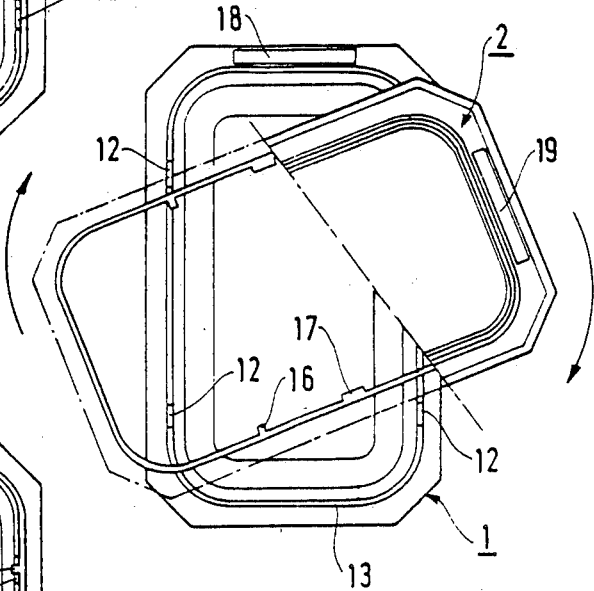
FIG. 6 is a plan view of the container showing the cover being rotated from its FIG. 5 position towards its FIG. 7 position.

In order to distinguish between the two different ventilation positions, a reference mark 18 is applied to the container 1 and a reference mark 19 is applied to the cover (see FIGS. 5, 6 and 7).

In the second position, the reference marks 18 and 19 are at opposite ends of the container (see FIG. 7).

A variant embodiment is shown in FIGS. 12 to 22, and the items which correspond to those in the embodiment shown in FIGS. 1 to 7 have the same reference numerals.

The vertical rib 6 of the container 1 does not include notches, but instead has four high projections 20' and four low projections 21' disposed on its long sides 13. The low projections 21' on a given side 13 are disposed on either side of the high projections 20', whereas on the other side it is the high projections 20' which are disposed on either side of the low projections 21'.

The vertical rib 9 on the cover 2 includes four shoulders 16' and four teeth 17' which are situated below the shoulders 16' near the bottom of the rib 9 and which are directed inwardly.

Figure 14:
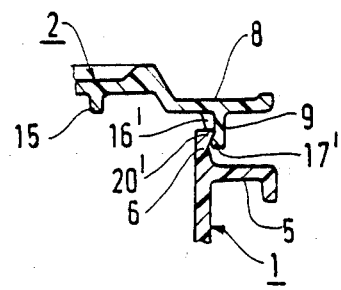
Figure 15:
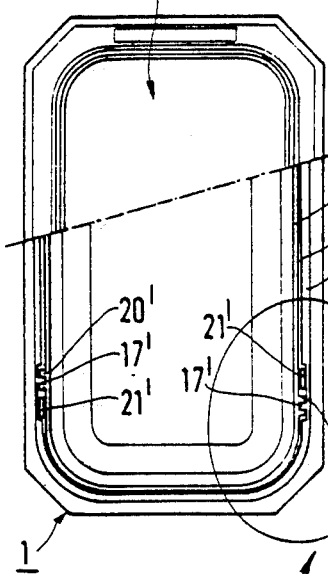
FIG. 15 is a plan view of said variant food container with its cover in the high ventilation position.
Figure 18:
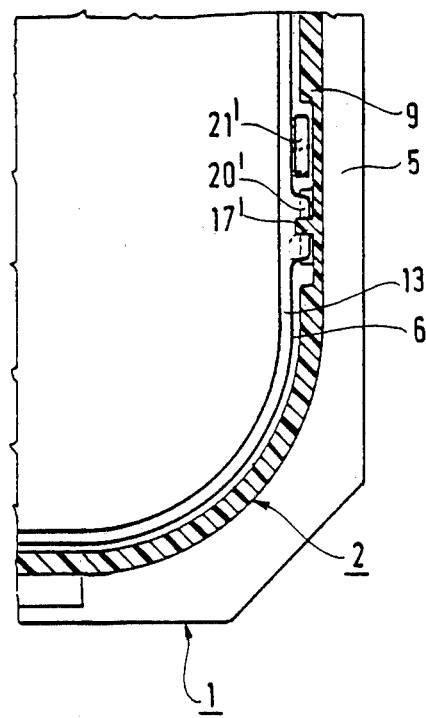
FIG. 18 shows a detail of FIG. 15 on an enlarged scale.
Figure 19:
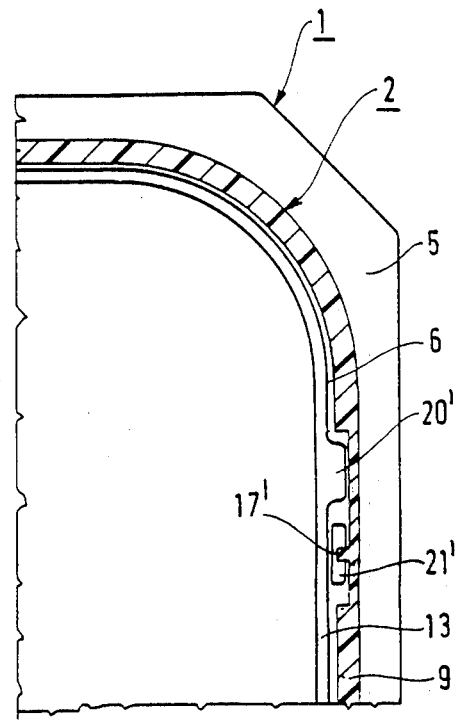
FIG. 19 shows a detail of FIG. 17 on an enlarged scale.
Figure 20:
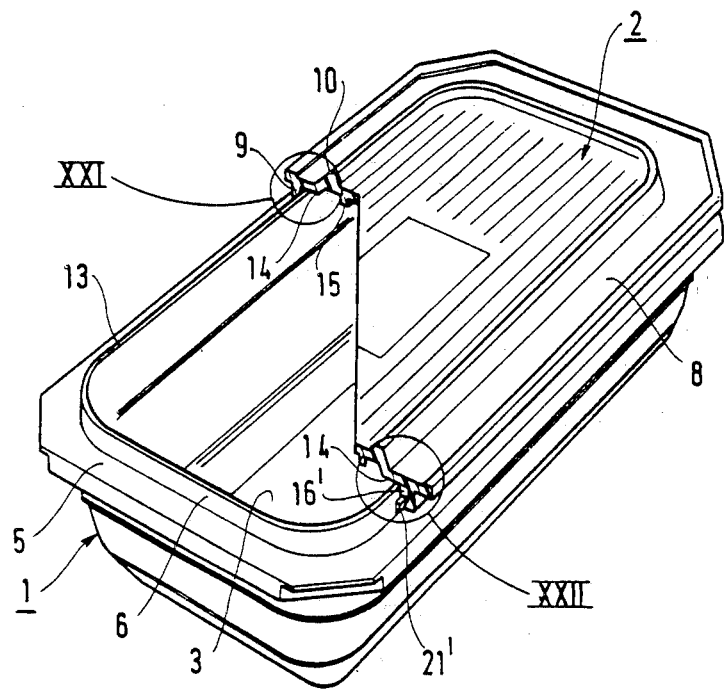
FIG. 20 is a partially cut-away perspective view of the variant food container in the low ventilation position.

Thus, in the first or upper position (see FIGS. 12 and 15), the shoulders 16' rest on the high projections 20' and the teeth 17' are engaged underneath the high projections 20', thereby holding the cover down on the container 1 (see FIGS. 14 and 18).

Figure 13:
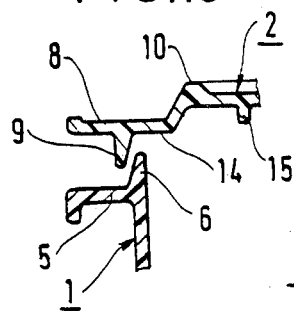
FIGS. 13 and 14 are section views on an enlarged scale of details of FIG. 12.

The passage between the ribs 6 and 9 allows for copious ventilation (see FIG. 13).

Figure 17:
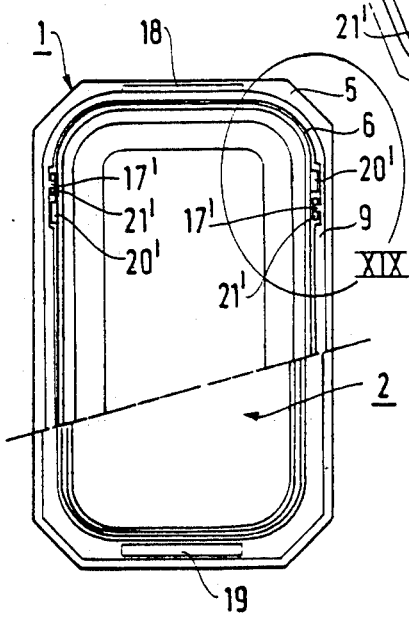
FIG. 17 is a plan view of this variant container with its cover in the low ventilation position.

When the cover is rotated through 180°, the shoulders 16' rest on the low projections 21' and the teeth 17' are engaged underneath these projections 21' (see FIGS. 19, 20 and 22), thereby snap-fitting the cover 2 to the container in the low position (see FIG. 17).

Figure 21:
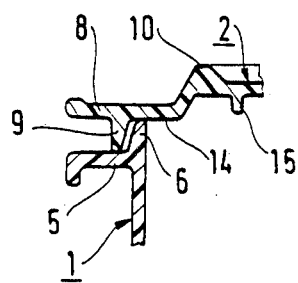
FIGS. 21 and 22 are section views on an enlarged scale of details of FIG. 20.
Figure 22:
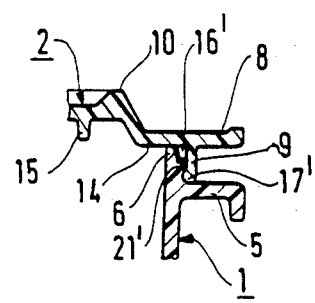

In this second or low position, the rib 9 of the cover 2 comes into contact with the rim 5 and/or the rib 6 comes into contact with the bottom face 14 of the cover 2, thereby reducing ventilation to air leakage (see FIG. 21).

Figure 16:
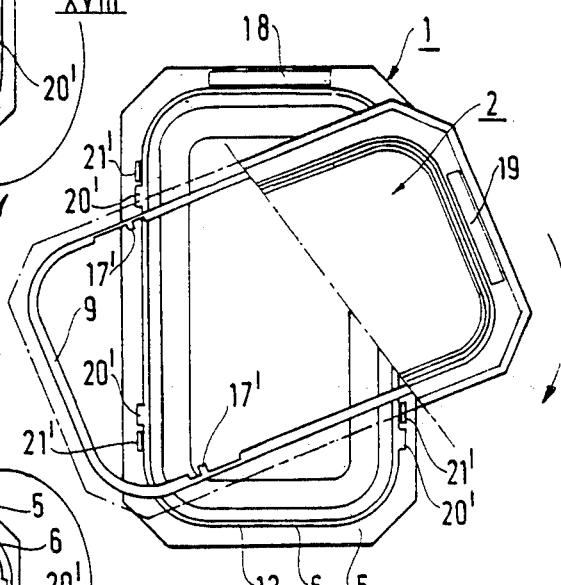
FIG. 16 is a plan view of the FIG. 15 container showing its cover being rotated from the FIG. 15 position towards the FIG. 17 position.

FIG. 16 shows the cover 2 being rotated from one position to the other.

The container described above is rectangular, but clearly it could be square. If a square container is used, it would be possible for the second position (low ventilation) to be at 90° from the first position (high ventilation) rather than at 180° as shown.

We claim:

1. A vertically upwardly open food container having a substantially rectangular horizontal bottom and integral flared upright walls terminating in a substantially rectangular horizontal opening and including a horizontal rim near the top thereof which is outwardly rectangular in shape and which surrounds the opening to the container, and a vertical rib extending the walls above the rim, said container being provided with a horizontal cover including firstly a horizontal rim and secondly a vertical rib projecting beneath the rim and engaging around the vertical rib of the container, with the vertical rib of the container having substantially the same height as the vertical rib of the cover, the container including the improvement whereby the cover rib includes a plurality of shoulders adjacent its top connection to the cover for engaging with the container rib in such a manner that in a first position the cover is in a high position with the bottom of the cover rib being raised above the container rim, and in a second position with the cover being low relative to the first position, the bottom of the cover rib comes close to or into contact with the container rim, whereby, with the cover rib being at a distance from the container rib in the first position considerable ventilation of the container interior occurs.

2. A food container according to claim 1, wherein the container rib is fitted with notches in which the shoulders are received when the cover is in its second position, said shoulders resting on the top of the container rib when the cover is in its first position.

3. A food container according to claim 2, wherein the container rib is provided with upper and lower outwardly directed projections and wherein the cover rib is provided with inwardly directed teeth near the bottom thereof, said teeth engaging under the upper projections when the cover is in its first position and under the lower projections when the cover is in its second position.

4. A food container according to claim 1, wherein the container rib has upper and lower outwardly directed projections, and wherein the shoulders rest on the upper projections when the cover is in its first position and on the lower projections when the cover is in its second position.

5. A food container according to claim 4, wherein the cover rib has inwardly directed teeth near the bottom thereof, said teeth engaging under the upper projections when the cover is in its first position and under the lower projections when the cover is in its second position.

6. A food container according to claim 1, wherein the bottom face of the cover is provided with a second rib which is situated parallel to and inside the first rib.

7. A food container according to claim 6, wherein the top face of the cover includes a raised portion surrounding the cover and including a gap at one point, said raised portion being disposed around a rectangle which is larger than the bottom of the cover and larger than a rectangle traced by the second rib of the cover, but which is smaller than a rectangle traced by the first rib of the cover, thereby enabling covers to be stacked on one another and also enabling containers to be stacked on covers.

* * * * *